(12) United States Patent
Baldwin (10) Patent No.: US 6,439,647 B1
(45) Date of Patent: Aug. 27, 2002

(54) FOLDING CAMPER FOR VEHICLE

(76) Inventor: James T. Baldwin, 9407B Old Redwood Hwy., Penngrove, CA (US) 94951

( * ) Notice: Subject to any disclaimer, the term of this patent is extended or adjusted under 35 U.S.C. 154(b) by 0 days.

(21) Appl. No.: 09/862,737

(22) Filed: May 22, 2001

(51) Int. Cl.[7] .................................................. B60J 7/10
(52) U.S. Cl. ...................................... 296/165; 296/164
(58) Field of Search ................................ 296/156, 164, 296/165

(56) References Cited

U.S. PATENT DOCUMENTS

| 3,175,857 A | * | 3/1965 | Lewis |
| 3,359,693 A | * | 12/1967 | Mitas |
| 4,629,243 A | | 12/1986 | Jensen |
| 4,807,924 A | | 2/1989 | Kottke |
| 4,943,108 A | | 7/1990 | Turnbull |
| 5,209,453 A | * | 5/1993 | Harkins, Jr. ............. 296/156 X |

* cited by examiner

*Primary Examiner*—Joseph D. Pape
(74) *Attorney, Agent, or Firm*—Jack Lo (57) ABSTRACT

The folding camper is comprised of an outer shell hinged to a side wall of the cargo bed of a vehicle, an inner shell hinged to an opposite side wall, a front panel hinged to a front wall, and a rear panel hinged to a rear wall. When collapsed, the outer shell spans the entire cargo bed, and generally follows the contour of the vehicle's cab to maximize volume without protruding beyond the top and sides of the cab for reduced drag. The inner shell is closely nestled under the outer shell and generally follows the internal contour of the outer shell, except for its distal side which is more slanted than the hinged side. To erect, the shells are tilted upward until their opposite sides meet, and the front and rear panels are tilted upward until they meet the lower edges of the shells.

22 Claims, 6 Drawing Sheets

FOLDING CAMPER FOR VEHICLE

BACKGROUND OF THE INVENTION

1. Field of the Invention

This invention relates generally to camper shells for mounting on vehicles.

2. Prior Art

Add-on campers are available for mounting on or in the cargo beds of pickup trucks. Since a typical camper is tall enough for a person to stand inside, it protrudes far above the cab of the truck. Its extremely large frontal area is severely detrimental to the aerodynamics and fuel efficiency of the truck, and its high center-of-gravity is detrimental to the handling of the truck. It does not fit into typical garages, and is even illegal to park in many neighborhoods. Some of the problems of fixed campers are solved by collapsible campers. For example, the one disclosed in U.S. Pat. No. 4,807,924 to Kottke is so compact when collapsed that it is substantially lower than the cab of the pickup truck for better aerodynamics and handling. It is comprised of a T-shaped housing for attaching to the cargo bed. Flat roof panels are hinged to the sides of the housing, and triangular wall panels are hinged to the front and rear ends of the housing. When the roof and wall panels are erected, a triangular shelter is formed and is disclosed as an "A frame." Since the roof panels fold on top of the housing, the housing must be very wide to allow the use of wide roof panels that form a tall shelter. The housing is so wide that the top of the T-shaped housing projects beyond the sides of the truck. The wide housing compromises aerodynamics, and makes parking in garages much more difficult. Even though the erected shelter is very tall, the perfectly triangular roofline makes the interior space very confining, especially for a standing person.

OBJECTIVES OF THE INVENTION

The objectives of the present folding camper are:

to provide a collapsible shelter for mounting on a vehicle;

to not exceed the width and height of the vehicle's cab when collapsed for better aerodynamics, better handling, and easier parking;

to be more roomy when erected;

to be leak resistant; and to automatically cover any roof-mounted external equipment when collapsed.

Further objectives of the present invention will become apparent from a consideration of the drawings and ensuing description.

BRIEF SUMMARY OF THE INVENTION

The folding camper is comprised of an outer shell hinged to a side wall of the cargo bed of a vehicle, an inner shell hinged to an opposite side wall, a front panel hinged to a front wall, and a rear panel hinged to a rear wall. When collapsed, the outer shell spans the entire cargo bed, and generally follows the contour of the vehicle's cab to maximize volume without protruding beyond the top and sides of the cab for reduced aerodynamic drag. The inner shell is closely nestled under the outer shell and generally follows the internal contour of the outer shell, except for its distal side which is more slanted than the hinged side. To erect, the shells are tilted upward until the edges of their opposite sides meet, and the front and rear panels are tilted upward until they meet the lower edges of the shells.

DRAWING REFERENCE NUMERALS

10. Camper
12. Vehicle
14. Side Wall of Truck Bed
16. Side Wall of Truck Bed
18. Front Wall of Truck Bed
20. Rear Wall of Truck Bed
22. Windows
24. Triangular Portion
11. Cargo Bed
13. Outer Shell
15. Inner Shell
17. Front Panel
19. Rear Panel
21. Door Lower Section
23. Hinged Windows
25. Triangular Portion
26. Cab
28. Hinged Side of Inner Shell
30. Linkage
32. Horizontal Edge
34. Triangular Panel
36. Roof
38. Gas Struts
27. Distal Side of Inner Shell
29. Space
31. Slanted Edge
33. Vertical Edge
35. Door Upper Section
37. Hinges
39. Distal Side of Outer Shell

DETAILED DESCRIPTION OF THE INVENTION

Figure 1:
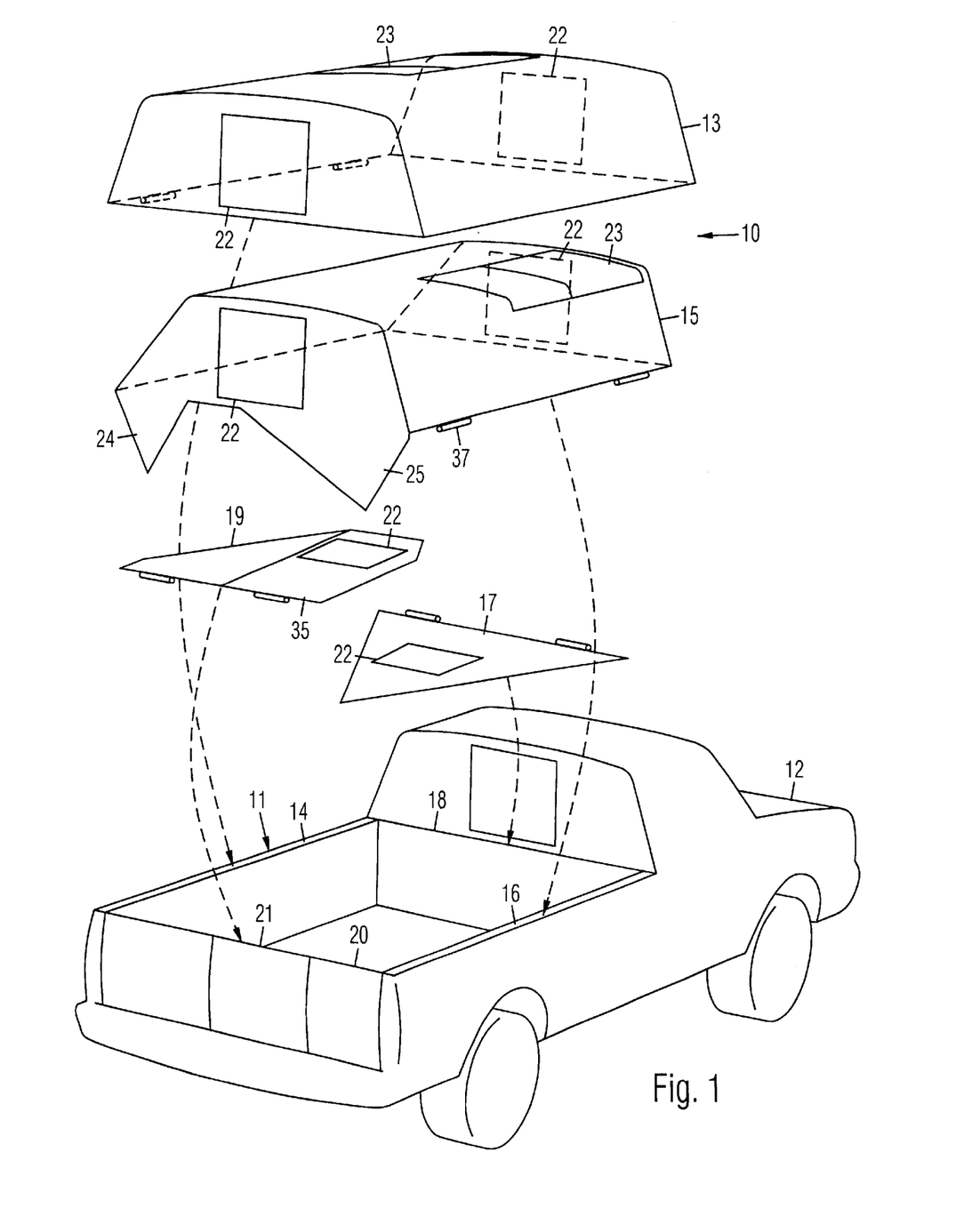
FIG. 1 is an exploded view of the present folding camper over a vehicle.

FIG. 1:

A preferred embodiment of the present folding camper 10 for being mounted on a cargo bed 11 of a vehicle 12, such as a pickup truck, is shown in an exploded view in FIG. 1. Vehicle 12 may be any type of vehicle, such as a van, a trailer, station wagon, delivery truck, etc. Vehicle 12 may be any motor vehicle with an open cargo bed. Camper 10 may be an add-on to a conventional vehicle, or it may be an integral part of a purpose-built camping or utility vehicle.

Camper 10 is comprised of a convex outer shell 13 with a proximal edge for being hinged to the top of a first side wall 14 of cargo bed 11, a convex inner shell 15 with a proximal edge for being hinged to the top of a second side wall 16, a front panel 17 for being hinged to the top of a front wall 18, and a rear panel 19 for being hinged to the top of a rear wall 20. Outer shell 13 and inner shell 15 are generally of inverted U-shapes. The shells and panels are connected to the cargo bed with hinges 37. Rear panel 19 is divided into a left portion and a right portion, wherein the right portion is comprised of a door 35 which is hinged to the left portion. Hinged door 35 can be flipped over the left portion to free the isle of the cargo bed when camper 10 is collapsed. Although outer shell 13 is hinged on the left and inner shell 15 is hinged on the right, they may be hinged on their opposite sides if mirror images of inner shell 15 and rear panel 19 are provided.

The original tail gate of vehicle 12 is preferably replaced with rear wall 20 which has a hinged door 21. Windows 22 are arranged on outer shell 13, inner shell 15, front panel 17, and rear panel 19 in exemplary positions. Windows 23, which are preferably top hinged, are arranged on the tops of outer shell 13 and inner shell 15. In this example, outer shell 13 has a planar bottom opening, whereas inner shell 15 has an irregular bottom opening with triangular portions 24 and 25 at its lower rear edge. Front panel 17 is triangular, whereas rear panel 19 is asymmetrical. Alternatively, the front of inner shell 15 may be provided with similar triangular portions as its rear, and front panel 17 may be identical to rear panel 19. Another alternative is that the lower opening of inner shell 15 may be planar and rear panel 19 may be triangular.

Figure 2:
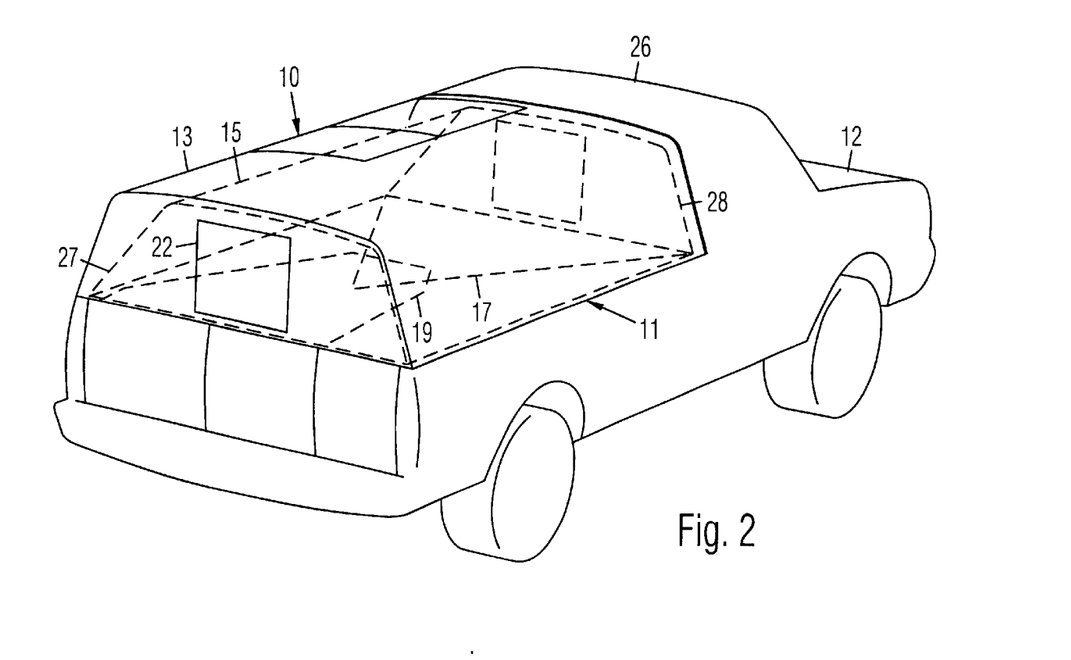
FIG. 2 is an end perspective view thereof when mounted on the vehicle and fully collapsed.
Figure 3:
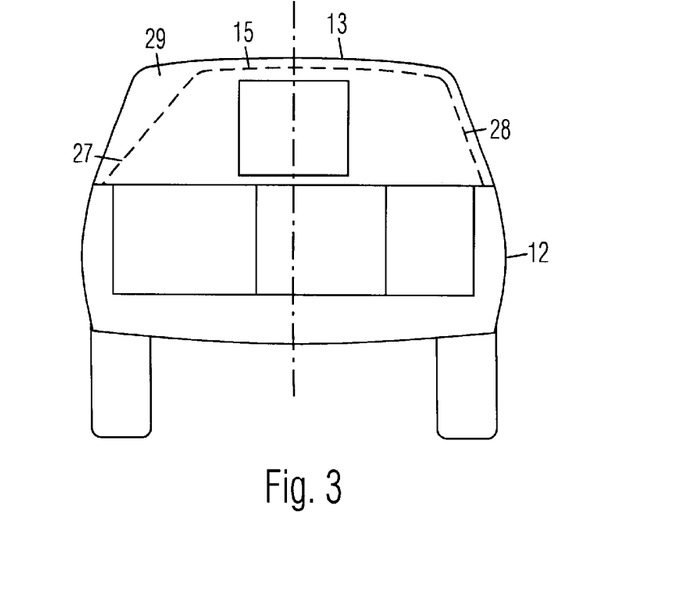
FIG. 3 is an end view thereof when fully collapsed.

FIGS. 2–3:

Camper 10 is shown mounted on vehicle 12 and fully collapsed in FIG. 2. Outer shell 13 spans cargo bed 11, and generally follows the contour of a cab 26 on vehicle 12 to maximize volume without protruding beyond the sides and top of cab 26 for reduced drag and improved fuel economy. Inner shell 15 is closely nestled under outer shell 13 and also spans cargo bed 11. Inner shell 15 generally follows the internal contour of outer shell 13 for maximizing volume, except for a distal side 27 which is more slanted than a proximal or hinged side 28. Front panel 17 and rear panel 19 are folded inward under inner shell 15. Windows 22 enable rear vision while driving.

As shown in FIG. 3, inner shell 15 is asymmetrical about the center line of vehicle 12. Again, distal side 27 of inner shell 15 is slanted more than hinged side 28. A fully enclosed space 29 is formed between distal side 27 of inner shell 15 and the adjacent side of outer shell 13. Space 29 can accommodate and protect any suitably sized equipment (not shown) mounted externally on distal side 27, such as antennas, solar panels, vents, etc. Enclosing the externally mounted equipment when camper 10 is collapsed improves aerodynamics. A solar panel can be mounted on distal side 27 under the windows of the outer shell to generate electricity even when the camper is closed.

Figure 4:
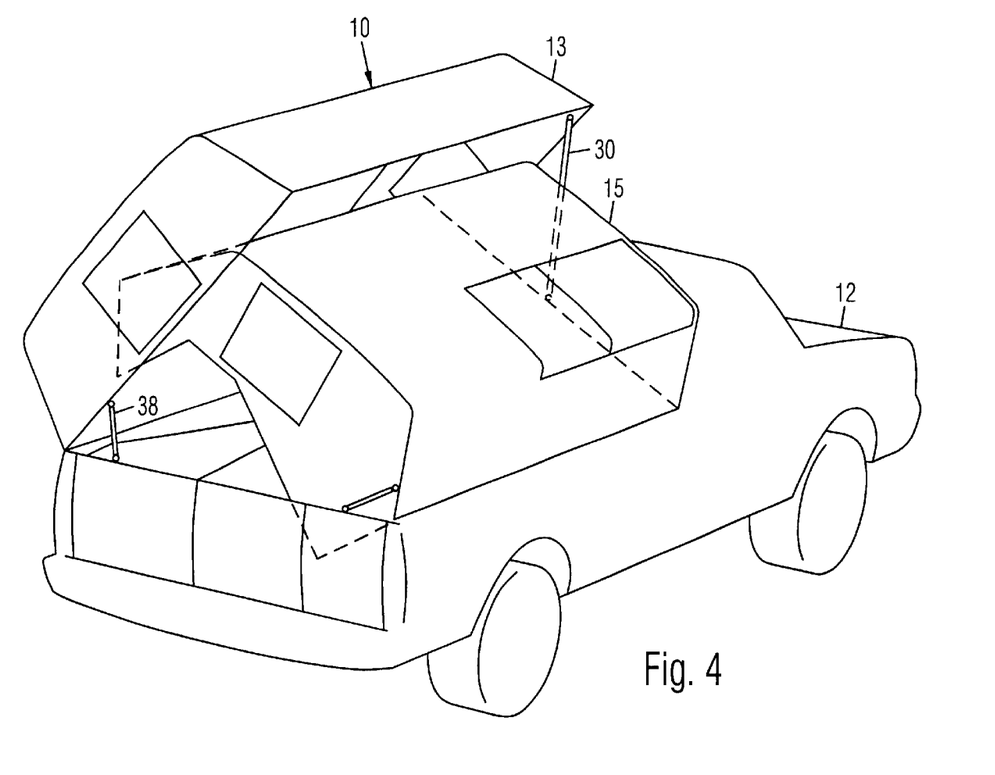
FIG. 4 is an end perspective view thereof when the shells are being tilted upward.
Figure 5:
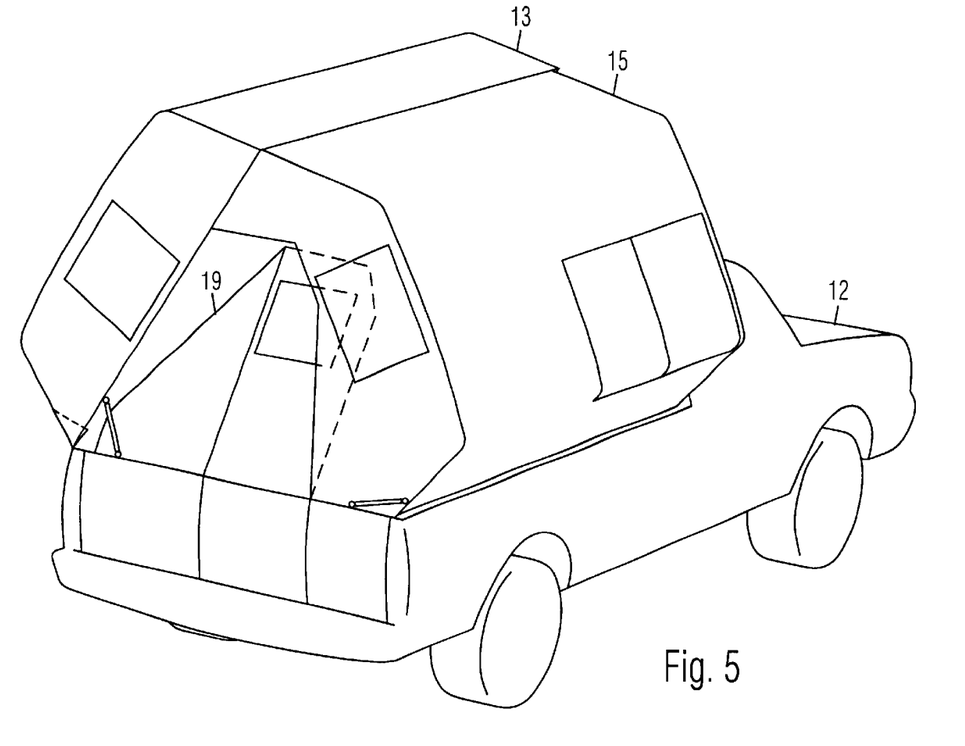
FIG. 5 is an end perspective view thereof when the rear panel is being tilted upward.

FIGS. 4–7:

In FIG. 4, the distal sides of outer shell 13 and inner shell 15 are being tilted upward to erect camper 10. Their movements are assisted by jacks or struts 38 at their front and rear ends. Outer shell 13 and inner shell 15 are preferably connected by a linkage 30 for synchronizing their movement and preventing interference. Additional linkages and control mechanisms may be provided. In FIG. 5, outer shell 13 and inner shell 15 are fully opened when their distal edges are in coincidence as shown. The distal edge of outer shell 13 preferably slightly overlaps the distal edge of inner shell 15 for waterproofing. Rear panel 19 and the front panel (not shown) are being tilted upward. Alternatively, the front and rear panels may be arranged to rise or lower vertically. The front and rear panels may even be eliminated by shaping the ends of the outer and inner shells to meet and form continuous front and rear walls when they are raised.

Figure 6:
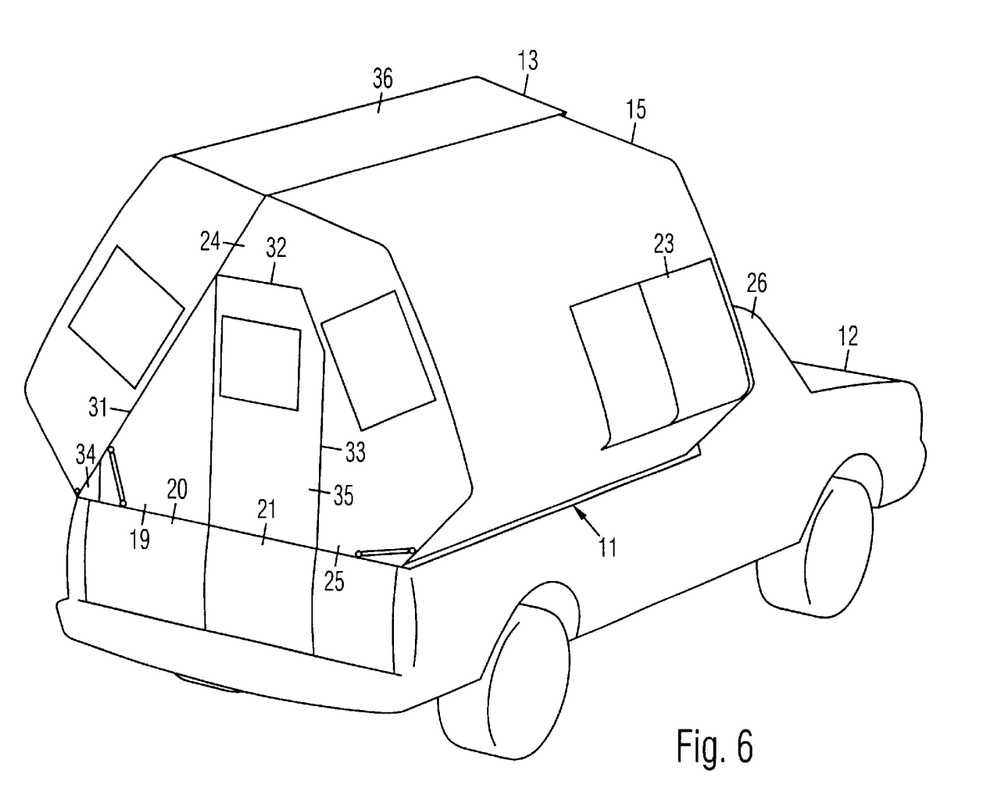
FIG. 6 is an end perspective view thereof when fully erected.

In FIG. 6, rear panel 19 and the front panel (not shown) are engaged against the lower edges of outer shell 13 and inner shell 15. When raised, rear panel 19 includes a slanted side edge 31 under outer shell 13, a horizontal top edge 32 under top triangular extension 24 of inner shell 15, and a vertical side edge 33 adjacent lower triangular extension 25 of inner shell 15. A small triangular hole remaining between outer shell 13 and rear panel 19 is filled by a triangular panel 34 which can be either pivoted or slid down from inside outer shell 13. All the joints between the shells and panels are provided with suitable seals. A door 35 is provided on rear panel 19, and is aligned and connected with door 21 on rear wall 20 of cargo bed 11 for simultaneous movement when camper 10 is erected. Windows 23 are preferably provided with movable inner coverings and hinged at their tops for tilting up to serve as sunshades.

Figure 7:
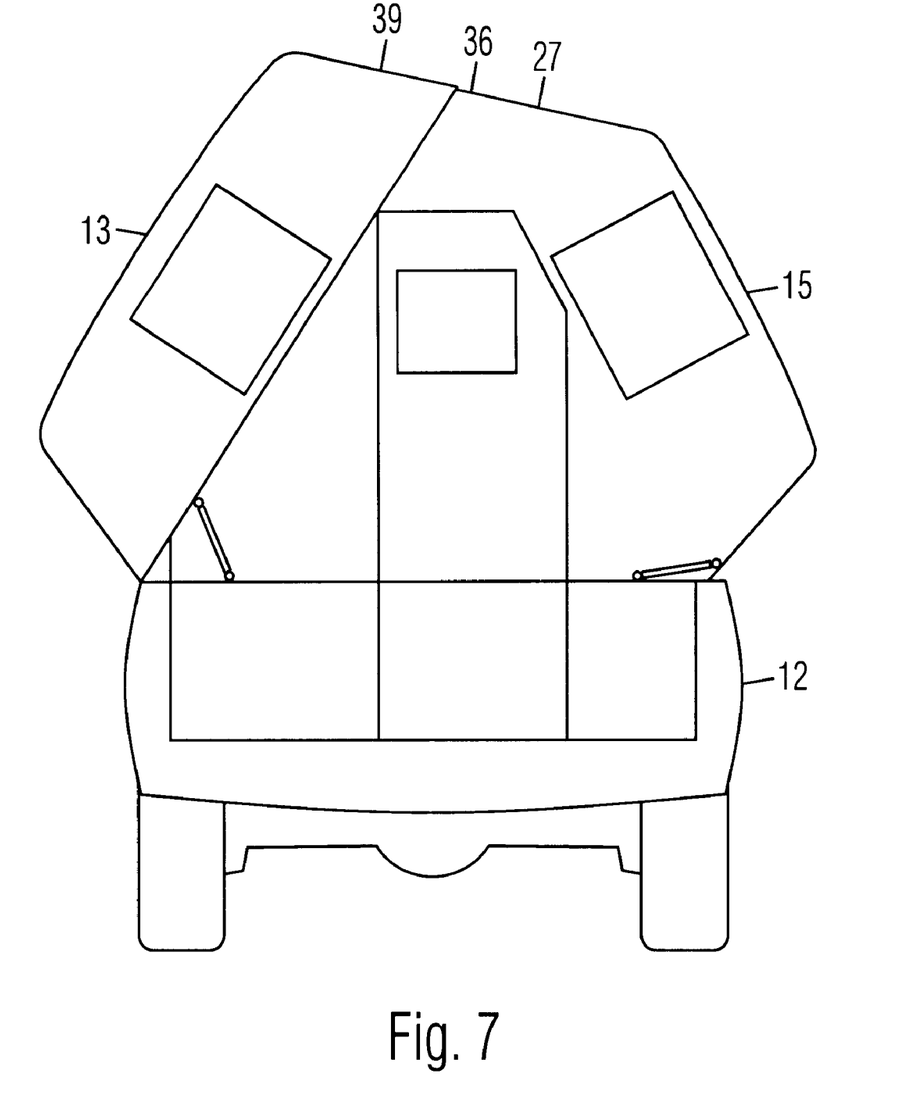
FIG. 7 is an end view thereof when fully erected.

A fully enclosed shelter is thus provided when camper 10 is erected. It is much wider and taller than cab 26 of vehicle 12 to provide ample living space. Camper 10 is generally hexagonal, including its base side. Since a roof 36 of camper 10 is one of the sides of the hexagon, camper 10 has much more useable headroom than prior art triangular campers. As shown in FIG. 7, the more slanted distal side 27 of inner shell 15 cooperates with a distal side 39 of outer shell 13 to form roof 36 with a continuous down slope for drainage. The continuous down slope cannot be formed if inner shell 15 is symmetrical, wherein the distal side is no more slanted than the hinged side, so that a valley would be formed and leaks might result.

SUMMARY AND SCOPE

Accordingly, the present camper provides a collapsible shelter for mounting on a vehicle. It does not exceed the width and height of the vehicle's cab when collapsed for better aerodynamics, improved fuel economy, better handling, and easier parking. It is more roomy when erected. It is leak resistant. It also automatically covers any roof mounted external equipment when collapsed.

Although the above description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A folding camper for a vehicle with a cab connected to a cargo bed, said folding camper comprising:

a convex outer shell with a proximal edge for being hinged to a first side of said cargo bed, wherein when said outer shell is folded, said outer shell is adapted to generally span horizontally across said cargo bed from said first side to an opposite second side, and when said outer shell is erected, said outer shell is adapted to angle acutely upward from said cargo bed; and a convex inner shell with a proximal edge for being hinged to said second side of said cargo bed, wherein when said inner shell is folded, said inner shell is adapted to generally span horizontally across said cargo bed from said second side to said first side, and when said inner shell is erected, said inner shell is adapted to angle acutely upward from said cargo bed; wherein when said outer shell and said inner shell are folded, said outer shell is adapted to generally follow a contour of said cab for reduced drag and improved fuel economy; and when said outer shell and said inner shell are erected, respective distal edges of said outer shell and said inner shell are generally in coincidence, and said camper is adapted to be substantially wider and taller than said cab for improved interior volume.

2. The folding camper of claim 1, wherein said outer shell and said inner shell are each generally of an inverted "U" shape when viewed from a rear of said camper, and said inner shell is arranged to be nestled closely under said outer shell when said camper is folded.

3. The folding camper of claim 1, further including struts connected between said inner shell and said cargo bed, and between said outer shell and said cargo bed.

4. The folding camper of claim 1, further including a linkage connected between said outer shell and said inner shell for synchronizing movement and preventing interference.

5. The folding camper of claim 1, wherein said distal edge of said outer shell is slightly overlapping on top of said distal edge of said inner shell for waterproofing when said camper is erected.

6. A folding camper for a vehicle with a cab connected to a cargo bed, said folding camper comprising:

a convex outer shell with a proximal edge for being hinged to a first side of said cargo bed, wherein when said outer shell is folded, said outer shell is adapted to generally span horizontally across said cargo bed from said first side to an opposite second side, and when said outer shell is erected, said outer shell is adapted to angle acutely upward from said cargo bed; and a convex inner shell with a proximal edge for being hinged to said second side of said cargo bed, wherein when said inner shell is folded, said inner shell is adapted to generally span horizontally across said cargo bed from said second side to said first side, and when said inner shell is erected, said inner shell is adapted to angle acutely upward from said cargo bed; wherein when said outer shell and said inner shell are folded, said outer shell is adapted to generally follow a contour of said cab for reduced drag and improved fuel economy;

when said outer shell and said inner shell are erected, respective distal edges of said outer shell and said inner shell are generally in coincidence, and said camper is adapted to be substantially wider and taller than said cab for improved interior volume; and said inner shell includes a more slanted distal side than a distal side of said outer shell, said more slanted distal side of said inner shell cooperating with said slanted distal side of said outer shell to define a roof with a continuous down slope for improved water drainage when said camper is erected.

7. The folding camper of claim 6, wherein said outer shell and said inner shell are each generally of an inverted "U" shape when viewed from a rear of said camper, and said inner shell is arranged to be nestled closely under said outer shell when said camper is folded.

8. The folding camper of claim 6, wherein said camper is generally hexagonal with six sides when erected, including a base side thereof, and said roof is comprised of one of said sides for improved headroom.

9. The folding camper of claim 6, further including a space defined between said more slanted distal side of said inner shell and a proximal side of said outer shell, wherein said space is adapted to enclose and protect any suitably sized equipment mounted externally on said more slanted distal side of said inner shell when said camper is folded.

10. The folding camper of claim 6, further including struts connected between said inner shell and said cargo bed, and between said outer shell and said cargo bed.

11. The folding camper of claim 6, further including a linkage connected between said outer shell and said inner shell for synchronizing movement and preventing interference.

12. The folding camper of claim 6, wherein said distal edge of said outer shell is slightly overlapping on top of said distal edge of said inner shell for waterproofing when said camper is erected.

13. A folding camper for a vehicle with a cab connected to a cargo bed, said folding camper comprising:

a convex outer shell with a proximal edge for being hinged to a first side of said cargo bed, wherein when said outer shell is folded, said outer shell is adapted to generally span horizontally across said cargo bed from said first side to an opposite second side, and when said outer shell is erected, said outer shell is adapted to angle acutely upward from said cargo bed;

a convex inner shell with a proximal edge for being hinged to said second side of said cargo bed, wherein when said inner shell is folded, said inner shell is adapted to generally span horizontally across said cargo bed from said second side to said first side, and when said inner shell is erected, said inner shell is adapted to angle acutely upward from said cargo bed;

a front panel for being hinged to a front of said cargo bed and movable from a folded position on top of said cargo bed to an upright erected position; and a rear panel for being hinged to a rear of said cargo bed and movable from a folded position on top of said cargo bed to an upright erected position; wherein when said outer shell and said inner shell are folded, said outer shell is adapted to generally follow a contour of said cab for reduced drag and improved fuel economy;

when said outer shell and said inner shell are erected, respective distal edges of said outer shell and said inner shell are generally in coincidence, and said camper is adapted to be substantially wider and taller than said cab for improved interior volume;

when said outer shell, said inner shell, said front panel, and said rear panel are erected, said front panel and said rear panel are abutted against lower edges of said outer shell and said inner shell; and said inner shell includes a more slanted distal side than a distal side of said outer shell, said more slanted distal side of said inner shell cooperating with said slanted distal side of said outer shell to form a roof with a continuous down slope for more reliable water drainage.

14. The folding camper of claim 13, wherein said outer shell and said inner shell are each generally of an inverted "U" shape when viewed from a rear of said camper, and said inner shell is arranged to be nestled closely under said outer shell when said camper is folded.

15. The folding camper of claim 13, wherein said camper is generally hexagonal with six sides when erected, including a base side thereof, and said roof is comprised of one of said sides for improved headroom.

16. The folding camper of claim 13, further including a rear wall adapted to be attached to said rear of said cargo bed, a vertically hinged first door section on said rear panel, and a vertically hinged second door section on said rear wall aligned with said first door.

17. The folding camper of claim 13, further including windows arranged on said front panel and said rear panel and adapted to be aligned with a rear window on said cab for rear vision.

18. The folding camper of claim 13, further including a space defined between said more slanted distal side of said inner shell and a proximal side of said outer shell, wherein said space is adapted to enclose and protect any suitably sized equipment mounted externally on said more slanted distal side of said inner shell when said camper is folded.

19. The folding camper of claim 13, further including struts connected between said inner shell and said cargo bed, and between said outer shell and said cargo bed.

20. The folding camper of claim 13, further including a linkage connected between said outer shell and said inner shell for synchronizing movement and preventing interference.

21. The folding camper of claim 13, wherein said distal edge of said outer shell is slightly overlapping on top of said distal edge of said inner shell for waterproofing when said camper is erected.

22. The folding camper of claim 13, further including a triangular panel arranged to fill a triangular hole remaining between said outer shell and said rear panel when said outer shell and said rear panel are erected.

* * * * *